(12) United States Patent
Patil et al.

(10) Patent No.: US 7,825,052 B2
(45) Date of Patent: Nov. 2, 2010

(54) REFRACTORY MATERIAL FOR REDUCED SIO2 CONTENT

(75) Inventors: Suhas N. Patil, Alliance, OH (US); Leonard J. Reinhart, East Liverpool, OH (US); Richard F. Wilk, Jr., Lisbon, OH (US)

(73) Assignee: Refractory Specialties, Incorporated

( * ) Notice: Subject to any disclaimer, the term of this patent is extended or adjusted under 35 U.S.C. 154(b) by 0 days.

(21) Appl. No.: 11/728,079

(22) Filed: Mar. 23, 2007

(65) Prior Publication Data

US 2008/0234123 A1 Sep. 25, 2008

(51) Int. Cl.
*C04B 35/00* (2006.01)
*C04B 35/14* (2006.01)
*C04B 35/16* (2006.01)

(52) U.S. Cl. .................... 501/96.5; 501/96.4; 501/97.1; 501/128; 501/133

(58) Field of Classification Search .................... 501/89, 501/128, 95.1, 95.2
See application file for complete search history.

(56) References Cited

U.S. PATENT DOCUMENTS

| 4,041,199 | A | * | 8/1977 | Cartwright | .................. | 428/35.8 |
| 4,384,046 | A | * | 5/1983 | Nakagami | .................. | 501/95.1 |
| 4,496,469 | A | | 1/1985 | Morimoto et al. | | |
| 4,533,644 | A | | 8/1985 | Jones | | |
| 4,650,775 | A | * | 3/1987 | Hill | ........................... | 501/95.1 |
| 4,751,205 | A | * | 6/1988 | Hill et al. | .................... | 501/95.1 |
| 4,868,142 | A | * | 9/1989 | Waisala et al. | ................ | 501/85 |
| 5,064,787 | A | * | 11/1991 | Banerjee | ...................... | 501/89 |
| 5,147,830 | A | * | 9/1992 | Banerjee et al. | ............... | 501/89 |
| 5,190,897 | A | * | 3/1993 | Azumi | ........................ | 501/81 |
| 5,318,930 | A | * | 6/1994 | Leung et al. | .................. | 501/32 |
| 5,480,707 | A | * | 1/1996 | Steffier | ........................ | 442/77 |
| 6,224,445 | B1 | | 5/2001 | Neukermans et al. | | |
| 2006/0242951 | A1 | | 11/2006 | Liang et al. | | |

FOREIGN PATENT DOCUMENTS

EP 0 395 203 * 10/1990

* cited by examiner

*Primary Examiner*—Melvin C Mayes
*Assistant Examiner*—Sarah Van Oudenaren
(74) *Attorney, Agent, or Firm*—The Belles Group, P.C.

(57) ABSTRACT

A refractory material used in refractory furnace liners, combustion chambers, baffles and artificial fire logs includes alumina silicate; an additive comprising at least one of silicon carbide, silicon nitride, boron carbide, boron nitride and silicon carbo-nitride; and a binder. The refractory material is light weight, has a high noise reduction capacity, is fire resistant and has a reduced silica content. In a most preferred embodiment, the additive makes up 50.0% to 55.0% of the material by weight, the binder makes up 4.5% to 5.0% of the material by weight and the linear shrinkage of the material is no greater than 3.5% at 2600° F. A preferred binder is colloidal silica although many others are suitable. Preferably, the material is free of cellulose fiber and sodium silicate.

10 Claims, 2 Drawing Sheets

REFRACTORY MATERIAL FOR REDUCED SIO2 CONTENT

BACKGROUND OF THE INVENTION

1. Technical Field

The present invention relates generally to refractory materials. More particularly, the invention relates to a refractory material which is light in weight, has a high noise reduction capacity and a reduced $SiO_2$ content. Specifically, the present invention relates to such a refractory material which is used primarily in furnace liners, combustion chambers and baffles.

2. Background Information

Traditional refractory products made from alumina silicate ($Al_2O_3$-$SiO_2$) contain large amounts of silica ($SiO_2$), typically in the range of about 45 to 75 percent. These products are available in granular form or as man-made fibers for vacuum-forming. The fiber products are commercially available under the tradenames of—FiberfraX®, Kaowool®, Alcen®, Saffil® etc. In addition to these $Al_2O_3$-$SiO_2$ fiber products, there are newly invented "bio-soluble fiber products" available to meet recent European regulations. These products (tradenames—Isofrax®, Insulfrax®, Superwool-607®, Superwool-607 Max®, Superwool-607 HT®) are rich in alkaline earths such as magnesium oxide, calcium oxide and significant amounts of silica (typically 60-80%). These bio-soluble fiber products exhibit very high level of solubility in lung fluids which helps to reduce their toxicity on human body.

While these traditional products have been successful in many regards, they do have some drawbacks. For example, silica is problematic if fluxing elements from group 1 of the periodic table are present in the material, most typically sodium (Na) and potassium (K). When various solid fuels are burned in a combustion chamber lined with a refractory material having high silica content, the air to fuel ratio is difficult to control and is continuously changing. There are times when the air to fuel ratio falls below 1:1, at least part of the time. The air to fuel ratio of less than 1:1 is harmful to silica, causing the silica to undergo a reduction reaction which ultimately leads to failure of the refractory material. Thus there is a need within the art to produce a refractory material with satisfactory qualities while reducing the silica content.

BRIEF SUMMARY OF THE INVENTION

The present invention provides a refractory material comprising: alumina silicate; an additive comprising at least one of silicon carbide, silicon nitride, boron carbide, boron nitride, silicon carbo-nitride, and a binder.

BRIEF DESCRIPTION OF THE DRAWINGS

Similar numbers refer to similar parts throughout the drawings.

DETAILED DESCRIPTION OF THE INVENTION

Figure 1:
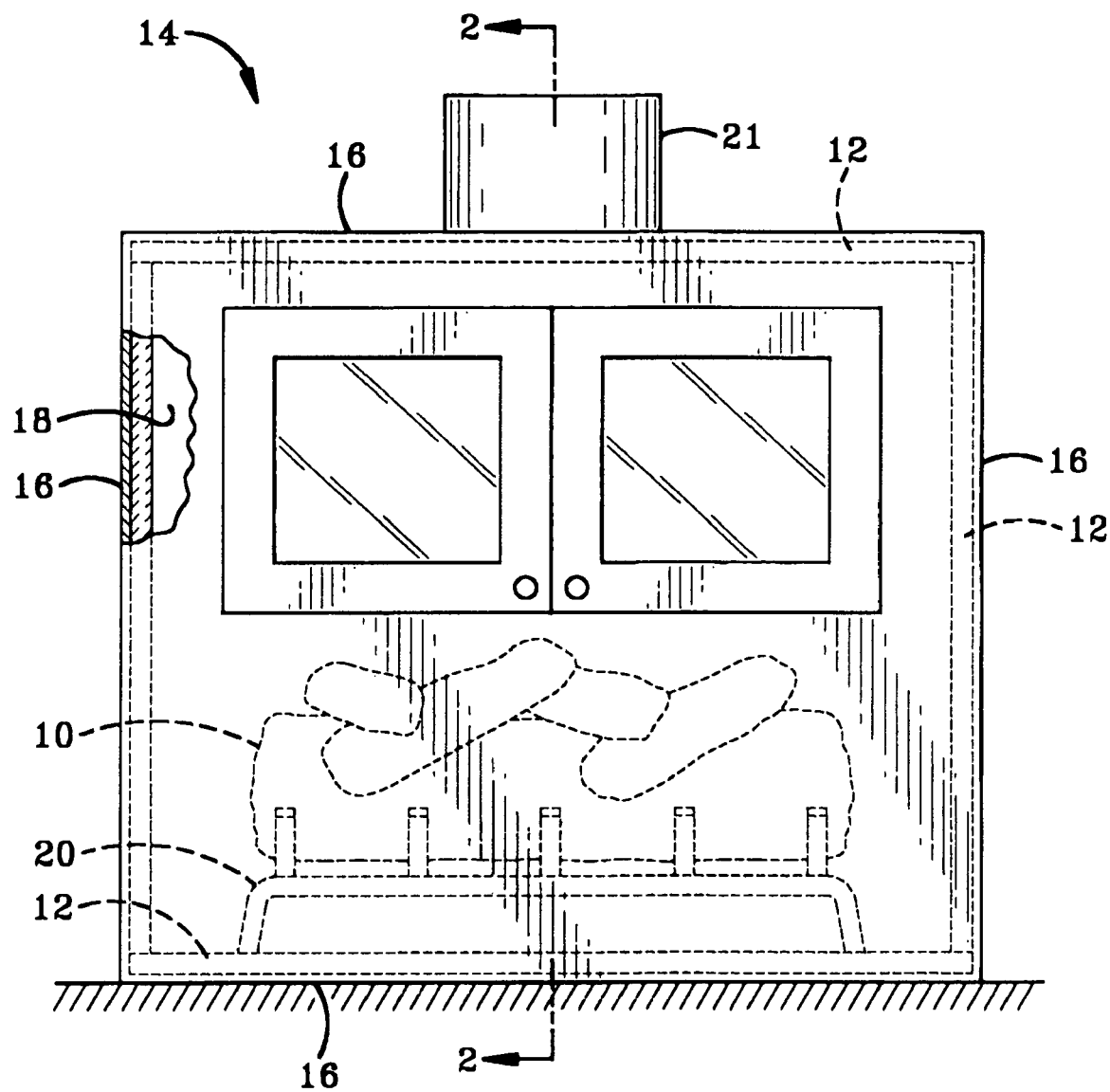
FIG. 1 is a diagrammatic front elevational view of a stove or heating appliance in which the refractory material of the present invention is used.

The refractory material of the present invention is most typically used in the form of furnace liners, combustion chamber walls and baffles, and may also be used as an artificial fire log. While the numeral 10 indicates an artificial fire log made of the refractory material of the present invention, it may also represent a fuel which is burned within a fire box 14 or stove or other heating appliance. In particular, these fuels are referred to herein as "unconventional" in that they generally contain chemicals that are considered corrosive to standard refractory materials, and are thus rarely used therewith and may thus be appropriately described as unconventional in the modern world. Examples of these unconventional fuels are wood, coal, corn, wood pellets, other bio-fuels, waste oil and synthetic gas made from carbonaceous waste. Waste oils include impurities such as sodium or potassium which are corrosive to the refractory material. Synthetic gas is produced from the waste materials or various garbage which is typically oxygen starved. More particularly, the gases produced are carbon rich, such as methane and carbon monoxide. These synthetic gases thus create an environment during burning which leads to the reduction of silica within refractory materials. This group of unconventional fuels typically includes fuels other than natural gas, No. 2 fuel oil, diesel or kerosene.

Fire box 14 may be free standing or positioned within a standard fireplace with a chimney thereabove. More particularly, fire box 14 includes various side walls 16 defining primary combustion chamber 18 in which are disposed fire logs or unconventional fuel 10 and which are lined by furnace liners 12 formed of the refractory material of the present invention. Furnace liners 12 are typically closely adjacent or in abutment with the inner surfaces of side walls 16 and fire logs or fuel 10 is disposed within chamber 18 and may be seated atop a fire grate 20. Fire logs 10 when used are typically heated by burning the noted unconventional fuels and fire box 10 is typically connected to a chimney or exhaust vent or flue 21 extending upwardly therefrom.

Figure 2:
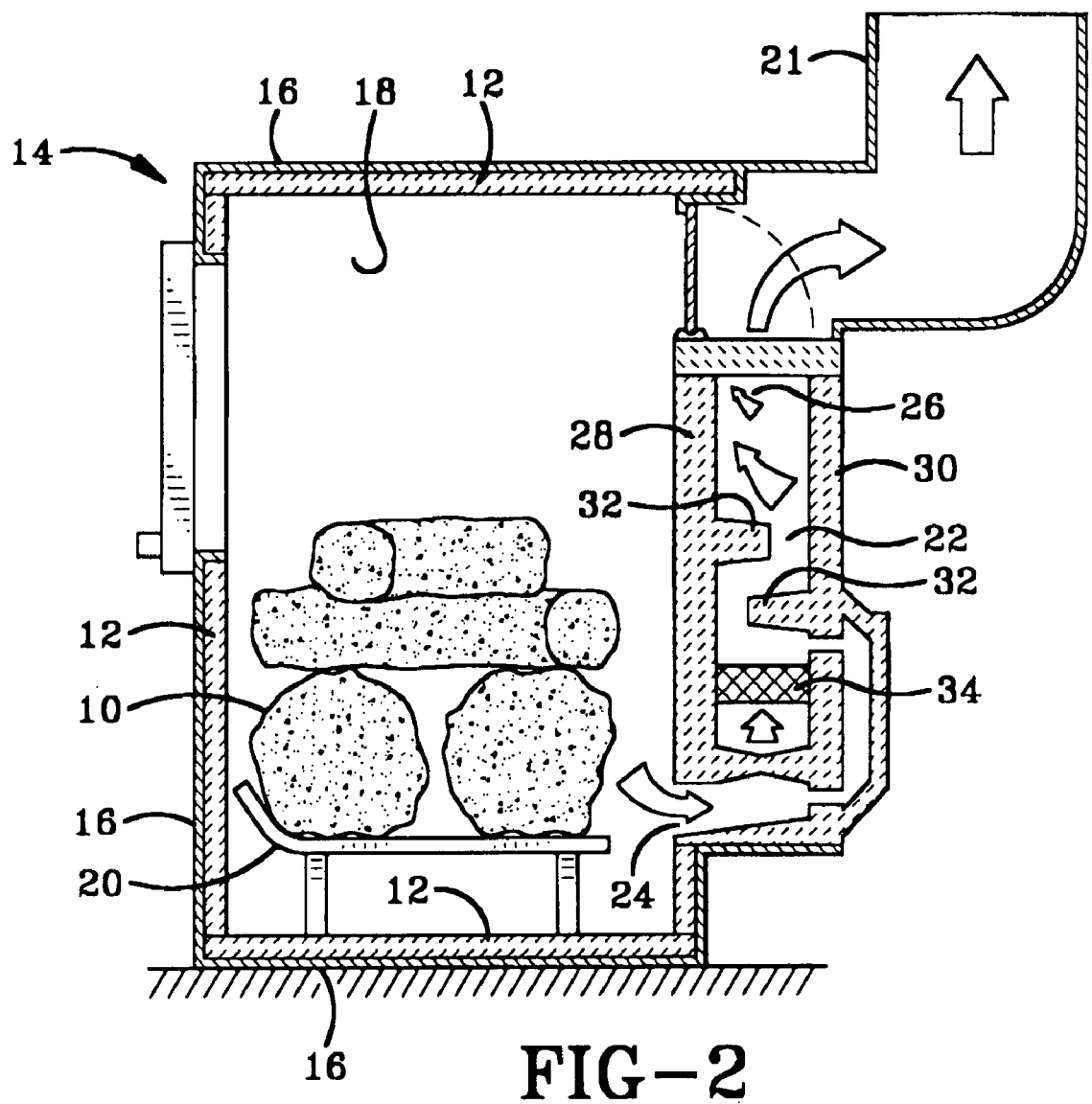
FIG. 2 is a sectional view taken on line 2-2 of FIG. 1.

Fire box 14 includes a secondary combustion chamber 22 bounded by refractory material of the present invention and in communication with primary chamber 18 via an intake 24. Exhaust gases and alike flow from primary chamber 18 into secondary chamber 22 via intake 24 and are exhausted therefrom via an exhaust outlet 26. The exhaust gases and air flow upwardly out of flue 21, the path of the exhaust gases being shown by the arrows in FIG. 2. More particularly, secondary combustion chamber 22 is bounded by and formed largely between front refractory member 28 and rear refractory member 30, which are formed of the refractory material of the current invention and serve as combustion chamber walls. A plurality of baffles 32 formed of the refractory material extend inwardly from refractory members 28 and 30 into chamber 22. A catalytic igniter 34 may be disposed within chamber 22. The figures in the present application are shown rather diagrammatically to indicate a broad application of the refractory material of the present invention. U.S. Pat. Nos. 4,646,712 and 4,856,491 each granted to Ferguson et. al disclose heating appliances utilizing secondary combustion chambers, baffles, liners and other refractory members in greater detail, and are incorporated herein by reference.

As noted in the Background section above, there is a need in the art to produce a refractory material with a reduced silica content. This is achieved in the present invention by replacing a substantial amount of silica within a refractory material with one or more of silicon carbide (SiC), silicon nitride (SiN), boron carbide (BC), boron nitride (BN) and silicon carbo-nitride. More particularly, one or more of these components is blended with alumina silicate fiber in order to reduce the silica content within the refractory material. The standard refractory materials are typically about 50% or more silica by weight. The present invention allows reduction of the silica content to 25% or less.

Silicon carbide and silicon nitride are stronger and more chemically stable than silica and also have a higher melting point. They are typically in the form of a powder or flakes which may coat the alumina silicate fibers in the material depending on the configuration thereof in a manner which protects the alumina silicate fibers. Silicon nitride and silicon carbide also have mild catalytic values which are helpful in cleaning combustion gases. Boron nitride is very slippery at high temperatures so that metals slide off of it, thus preventing chemical reactions therebetween. The fact that alumina silicate may come as a fibrous material is important in providing the structural strength to the refractory material formed therewith. On the other hand, silicon carbide, silicon nitride, boron carbide, boron nitride, and silicon carbo-nitride cannot be formed in fibers. If they were capable of a fibrous configuration, then they would be suitable for replacing silica or alumina silicate in refractory products. However, due to their inability to form fibers, these components still depend on the fibrous aspects of alumina silicate to provide the structural integrity to the refractory material which is needed in many applications.

More particularly, the refractory material of the present invention includes alumina silicate, an additive in the form of one or more of silicon carbide, silicon nitride, boron carbide, boron nitride, and silicon carbo-nitride, along with a suitable binder. The amount of the additives by weight is preferably from 1.0% to 80%, more preferably from 45% to 65% and most preferably from 50% to 55%.

The binder is typically colloidal silica although other binders may be suitable. For instance, suitable binders may include a colloidal suspension of oxides, metals and nonmetals such as alumina, zirconia, titania and so forth. Other suitable binders include naturally occurring polymeric materials such as starch, latex, tree gum and the like, or synthetic polymeric binders such as phenol formaldehyde and urea-formaldehyde. These binders are commercially available as water-based or oil-based liquids. However, the amount of the binders in the refractory material is expressed as a solid weight, so that the binders preferably make up 2% to 10% of the refractory material, more preferably from 4% to 6% and most preferably from 4.5% to 5%.

Preferably, the refractory material of the present invention has a melting point in excess of 3,200° F. The linear shrinkage of the material at the most preferred ranges given above is less than 3.5% at 2,600° F., which is a significant improvement over known prior art refractory materials. Preferably, the refractory material of the present invention is free of sodium silicate, which in part is undesirable due to its water solubility. In addition, the preferred material is free of cellulose fiber.

In short, the refractory material of the present invention is lightweight, has a high noise reduction coefficient, is fire-resistant and reduces the silica content compared to known prior art products.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A refractory material comprising:
   a fibrous body formed of;
      alumina silicate fibers;
      an additive selected from a group consisting of silicon carbide, silicon nitride, boron carbide, boron nitride and silicon carbo-nitride, the additive blended with the alumina silicate fibers; and
      colloidal silica that acts as a binder;
   wherein the alumina silicate fibers provide structural integrity to the fibrous body;
   wherein the linear shrinkage of the material is no greater than 3.5% at 2600 degrees Fahrenheit;
   wherein the material has a silica content of 25% or less by weight;
   wherein the colloidal silica makes up 4.5% to 5.0% of the material by weight; and
   wherein the additive makes up 50.0% to 55.0% of the material by weight.

2. The material of claim 1 wherein the additive is silicon carbide.

3. The material of claim 1 wherein the additive is silicon nitride.

4. The material of claim 1 wherein the additive is boron carbide.

5. The material of claim 1 wherein the additive is boron nitride.

6. The material of claim 1 wherein the additive is silicon carbo-nitride.

7. The material of claim 1 wherein the material is free of cellulose fiber.

8. The material of claim 1 wherein the material is free of sodium silicate.

9. The material of claim 1 wherein the melting point of the material is at least 3200 degrees Fahrenheit.

10. A combustion apparatus comprising:
   a combustion chamber;
   a source of fuel located within the combustion chamber for burning, the fuel selected from the group consisting of wood, coal, corn, wood pellets, bio-fuels, waste oil, and synthetic gas made from carbonaceous waste;
   one or more fibrous boards lining the combustion chamber;
   wherein the fibrous boards are constructed of alumina silicate fibers that provide structural integrity to the fibrous body, an additive selected from a group consisting of silicon carbide, silicon nitride, boron carbide, boron nitride and silicon carbo-nitride, the additive blended with the alumina silicate fibers, and a binder;
   wherein the additive makes up 50.0% to 55.0% of the material by weight; wherein the binder makes up 4.5% to 5.5% of the material by weight; wherein the material has a melting point in excess of 3,200 degrees Fahrenheit;
   wherein the linear shrinkage of the material is no greater than 3.5% at 2,600 degrees Fahrenheit; and
   wherein the material has a silica content of 25% or less by weight.

* * * * *